United States Patent [19]

Thomas et al.

[11] Patent Number: 5,603,797
[45] Date of Patent: Feb. 18, 1997

[54] FLEXIBLE REINFORCED RUBBER PART MANUFACTURING PROCESS UTILIZING STEREOLITHOGRAPHY TOOLING

[75] Inventors: Stan W. Thomas, Garland; Willie K. Jackson, Greenville; Roger D. Key, Greenville; Gary L. White, Greenville; Keith D. Elwell, Greenville; Kyle G. Fluegel, Greenville, all of Tex.

[73] Assignee: E-Systems, Inc., Dallas, Tex.

[21] Appl. No.: 462,802

[22] Filed: Jun. 5, 1995

Related U.S. Application Data

[60] Continuation of Ser. No. 226,023, Apr. 11, 1994, abandoned, which is a division of Ser. No. 977,017, Nov. 16, 1992, abandoned.

[51] Int. Cl.$^6$ .................................................. B32B 5/10
[52] U.S. Cl. .................................. 156/272.8; 156/273.3; 156/275.5; 156/279; 156/281; 156/289; 264/308; 264/401
[58] Field of Search ........................... 156/272.2, 275.5, 156/58, 59, 192, 281, 289, 155, 272.8, 273.3, 279; 264/401, 402, 221, 317, 308; 425/174.4

[56] References Cited

U.S. PATENT DOCUMENTS

| | | | |
|---|---|---|---|
| 4,475,976 | 10/1984 | Mittelstadt et al. | 156/286 |
| 4,575,330 | 3/1986 | Hull | 425/174.2 |
| 4,773,952 | 9/1988 | Wesley, Jr. | 156/191 |
| 4,844,144 | 7/1989 | Murphy | 164/35 |
| 5,031,483 | 7/1991 | Weaver | 76/107.1 |
| 5,173,220 | 12/1992 | Reiff | 264/401 |
| 5,176,188 | 1/1993 | Quinn et al. | 164/516 |
| 5,178,673 | 1/1993 | Caster et al. | 106/38.2 |
| 5,204,055 | 4/1993 | Sachs et al. | 419/2 |
| 5,242,646 | 9/1993 | Torigoe et al. | 264/317 |
| 5,296,335 | 3/1994 | Thomas | 156/275.5 |
| 5,358,211 | 10/1994 | Sterett | 249/80 |
| 5,387,380 | 2/1995 | Cima et al. | 264/69 |

OTHER PUBLICATIONS

Keverian, J. "Rapid Part Manufacturing", IEEE 1990 pp. 1211–1216.

*Primary Examiner*—James Sells
*Attorney, Agent, or Firm*—Harold E. Meier

[57] ABSTRACT

A single-tool manufacturing process utilizing a stereolithographic tool for fabricating flexible reinforced rubber parts. The stereolithographic tool is fabricated using a laser and computer-controlled optical scanning system. Then fabric and resin are manually applied to the tool. The stereolithographic tool is utilized like a mold, with successive layers of fabric and resin applied thereto. After curing, the mold is shattered and removed from the designed part.

2 Claims, 4 Drawing Sheets

FLEXIBLE REINFORCED RUBBER PART MANUFACTURING PROCESS UTILIZING STEREOLITHOGRAPHY TOOLING

This is a continuation of application Ser. No. 08/226,023, filed Apr. 11, 1994, now abandoned, which is divisional of application Ser. No. 07/977,017, filed Nov. 16,1992, now abandoned.

TECHNICAL FIELD

This invention relates to manufacturing processes for producing rubber parts and more particularly to a manufacturing process utilizing stereolithography for producing rubber parts.

BACKGROUND OF THE INVENTION

There are two primary multi-step manufacturing processes for producing flexible reinforced rubber parts. One process involves hot curing at very high temperatures, with application of positive pressure during the curing process. Typically, the rubber and reinforcing material are combined on or in a tool or mandrel and then cured in an oven. Manufacturing tooling for this process is expensive and time consuming, making large quantities necessary for cost effectiveness. Flexible reinforced rubber parts requiring high temperature and positive pressure processes include tires and flexible ducting for gas and liquids.

The other main prior art method for fabricating flexible rubber reinforced parts uses a room temperature cure with no added pressure. The rubber and reinforcing material are applied to a tool and then cured at room temperature for a specific time period. As with the high temperature/positive pressure method, manufacturing tooling is costly and time intensive. Flexible reinforced rubber parts fabricated using room temperature curing include flexible ducting for gases and liquids.

The main disadvantage of the room temperature method is the tooling and time effort required to produce the part. Three separate tools are required to fabricate a single part. Moreover, additional parts require a wash-away tool for each part fabricated. The entire process is labor and time intensive. The lengthy in-process time also contributes to the possibility of human error.

Another disadvantage of the prior art methods is the cost and schedule impacts incurred when incorporating design changes after the tool has been fabricated. Often, such changes may require that the entire tooling process be repeated.

Stereolithography is a three-dimensional process that produces copies of solid or surface models in plastic using a computer-aided design system. Although stereolithography has been used in various applications, it has not been applied in the process of fabricating reinforced rubber parts.

SUMMARY OF THE INVENTION

The present invention comprises a manufacturing process for fabricating flexible reinforced rubber parts using stereolithography tooling which overcomes the foregoing disadvantages associated with the prior art.

The process of the present invention includes the steps of designing a part on a computer-aided design system; fabricating a stereolithographic tool; applying successive layers of glass fabric and silicone resin to the stereolithographic tool; curing the applied glass fabric and silicone resin; and removing the stereolithographic tool, thereby producing the final part.

The process of the present invention may be utilized where limited numbers of flexible reinforced rubber parts are required. The process is especially useful for applications where shape is unique and manufacturing time is limited. The process may be used in the area of ducts for gases and liquids. Applications presently using the prior art processes, such as aircraft environmental control systems, conditioned air distribution systems and ground support equipment, may also benefit from the process of the present invention.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
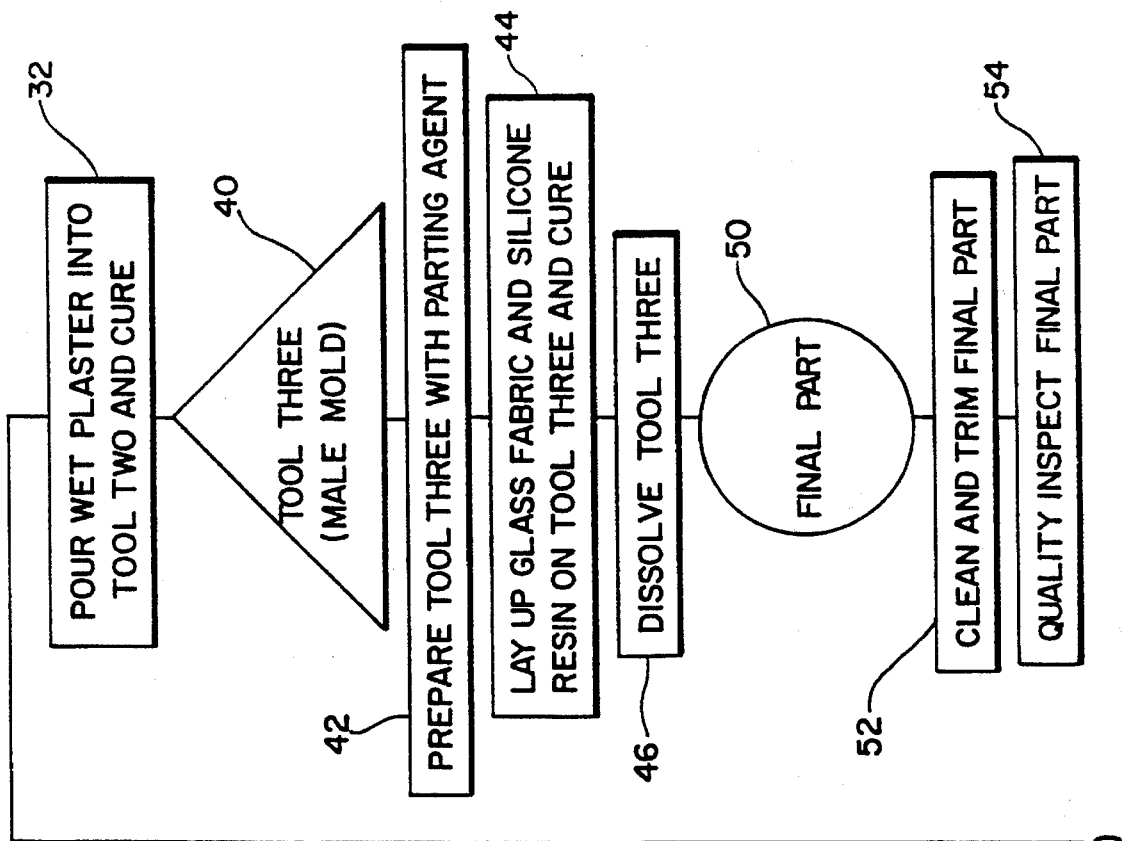
FIG. 1 is a flow diagram illustrating the steps of the prior art room temperature curing process for fabricating flexible reinforced rubber parts.
Figure 1:
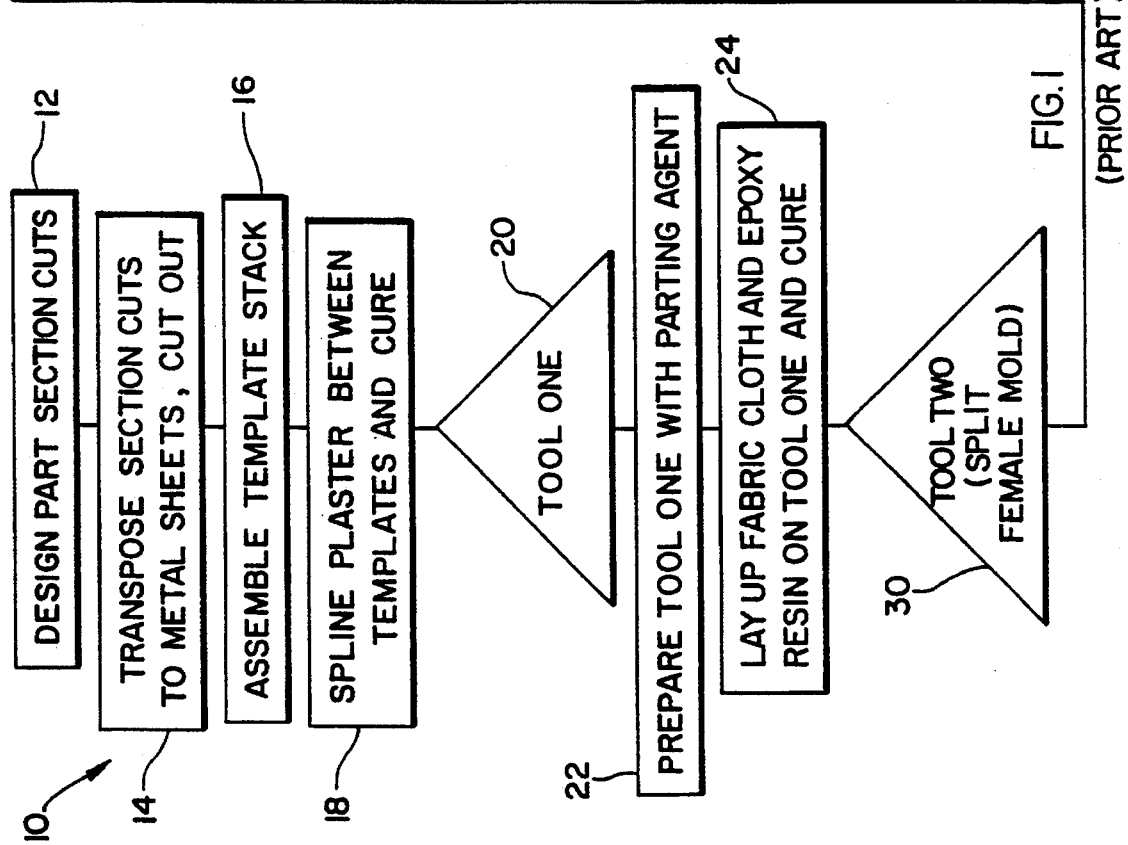
Figure 2:
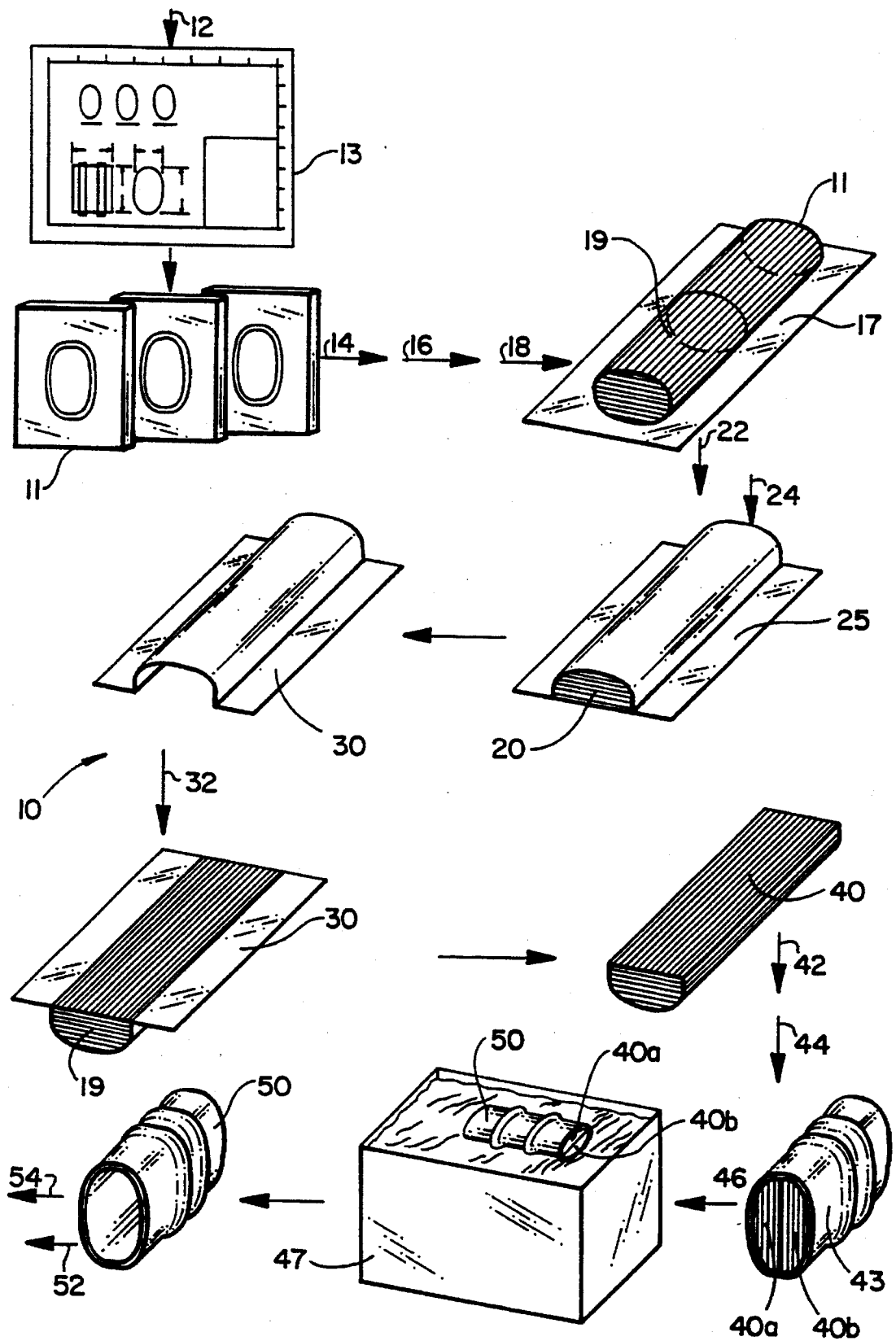
FIG. 2 is a schematic diagram of the prior art process, illustrating fabrication of a sample part.

Referring now to the Drawings, wherein like reference characters designate like or similar parts throughout the four views, FIG. 1 is a flow diagram illustrating the steps of the prior art room temperature curing process 10 for fabricating flexible reinforced rubber parts. FIG. 2 illustrates fabrication of a sample part using the prior art process.

Referring to FIGS. 1 and 2, a part is designed at process step 12 and recorded on a paper media or a computer-aided design (CAD) system. Cross-sectional cuts 11 are recorded for the design at locations defining the overall shape of the part. The system can generate a drawing 13 showing the proposed section cuts in the designed part. The cross-sectional cuts 11 are transposed onto thin sheets of metal (e.g., aluminum) and then cut out as templates during process step 14.

The plates are assembled during process step 16 according to the dimensions of the drawing 13 and fixed to a base 17. If the part has negative draft angles creating trapped areas, the plates are cut in half, and two fixed base arrangements are made representing the two halves of the part. Plaster 19 is poured between the plates, smoothed at the surface, and allowed to cure (step 18).

The above-described process produces a tool made of aluminum plates and plaster that is a dimensionally correct match to the designed part. This tool is referred to as tool one 20, or the master tool.

Tool two 30, is a female mold used to fabricate the final tool. To change from tool one to tool two, the surface of tool one 20 is prepared with a parting agent during process step 22. Tool two is formed from a manual composite lay up of glass fabric and epoxy tooling resin 25 on tool one 20 during the process step 24. After the lay-up 25 is cured and removed from tool one 20, the result is a split female mold, tool two 30.

Tool three 40 is a male mold utilized to fabricate the final part. Tool three 40 is fabricated of a water soluble plaster material. A wet solution of plaster 19 is poured into tool two 30 during the process step 32. When the plaster 19 hardens, it is a solid representation of the inside mold line of the designed part, tool three 40. Tool three 40 is removed from tool two 30.

To fabricate the final part 50, the surface of tool three 40 is prepared with a parting agent during the step 42. Glass fabric that has been wet out with RTV silicone resin 43 is manually applied in successive plies during the process step 44. The number of plies of material is determined by the flexibility and strength requirements of the final part 50. In FIG. 2, glass fabric and resin 43 are applied to tool three-A 40a and tool three-B 40b simultaneously during step 44.

The lay-up 43 of the final part 50 is allowed to cure from twelve to twenty-four hours before removal of tool three 40 during process step 46. When cured, the final part 50, with the tool three-A 40a and tool three-B 40b in place, is soaked in an agitated water bath 47 during step 46 for two to twelve hours to dissolve tool three. The final part 50 is dried, cleaned and trimmed during step 52 and available for quality inspection during step 54.

Figure 3:
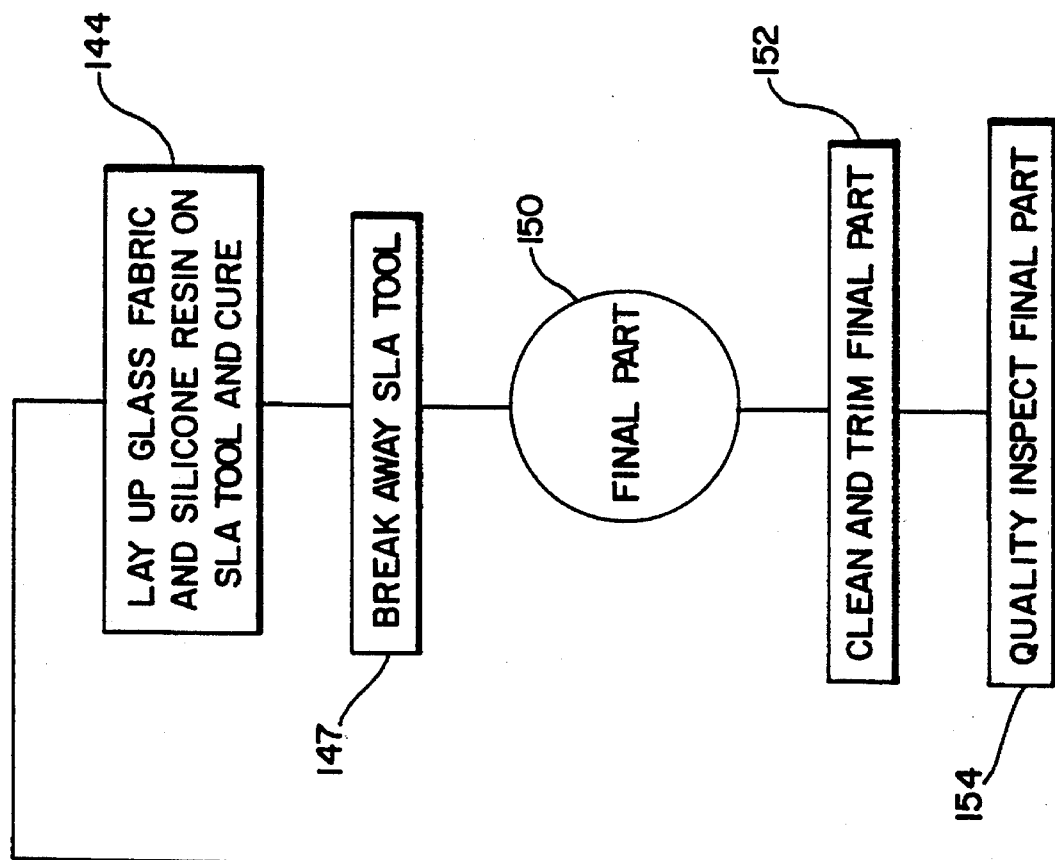
FIG. 3 is a flow diagram illustrating the steps of the manufacturing process of the present invention for fabricating flexible reinforced rubber parts using stereolithography tooling.
Figure 3:
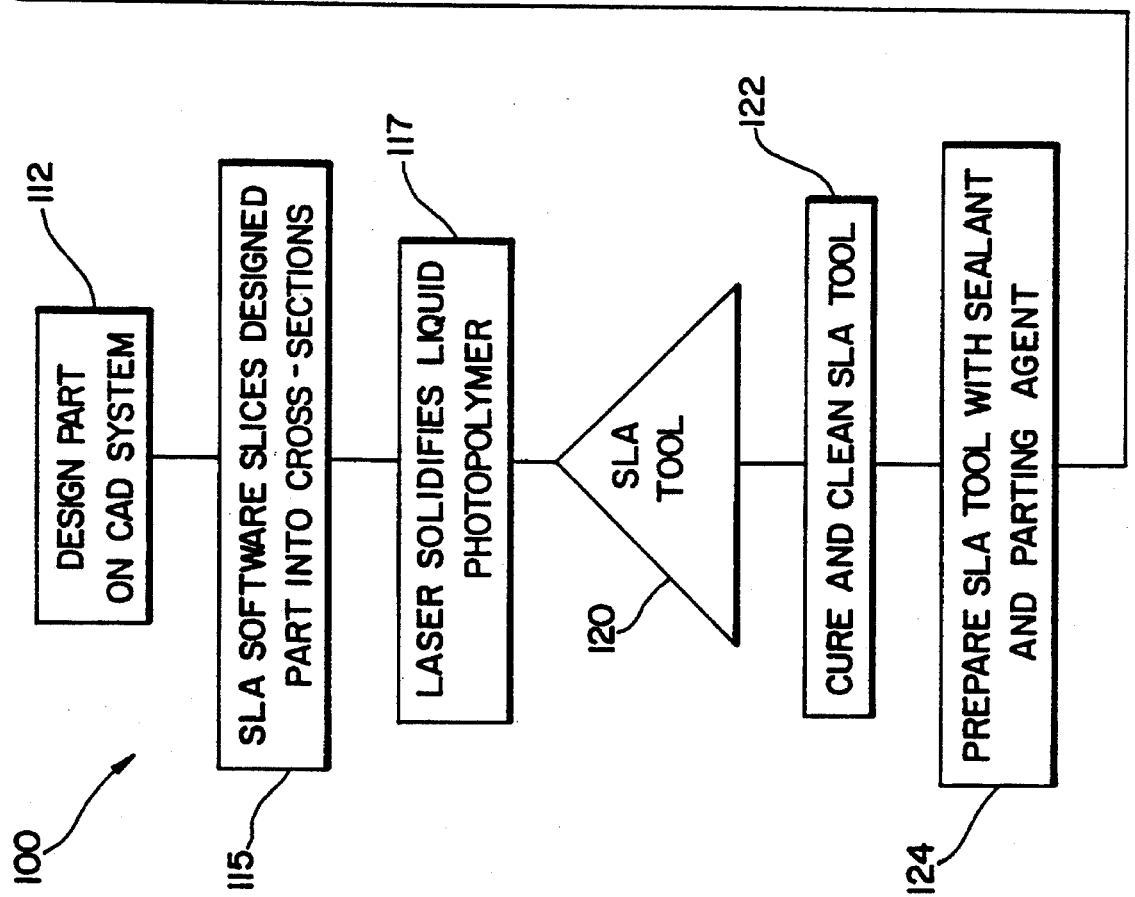
Figure 4:
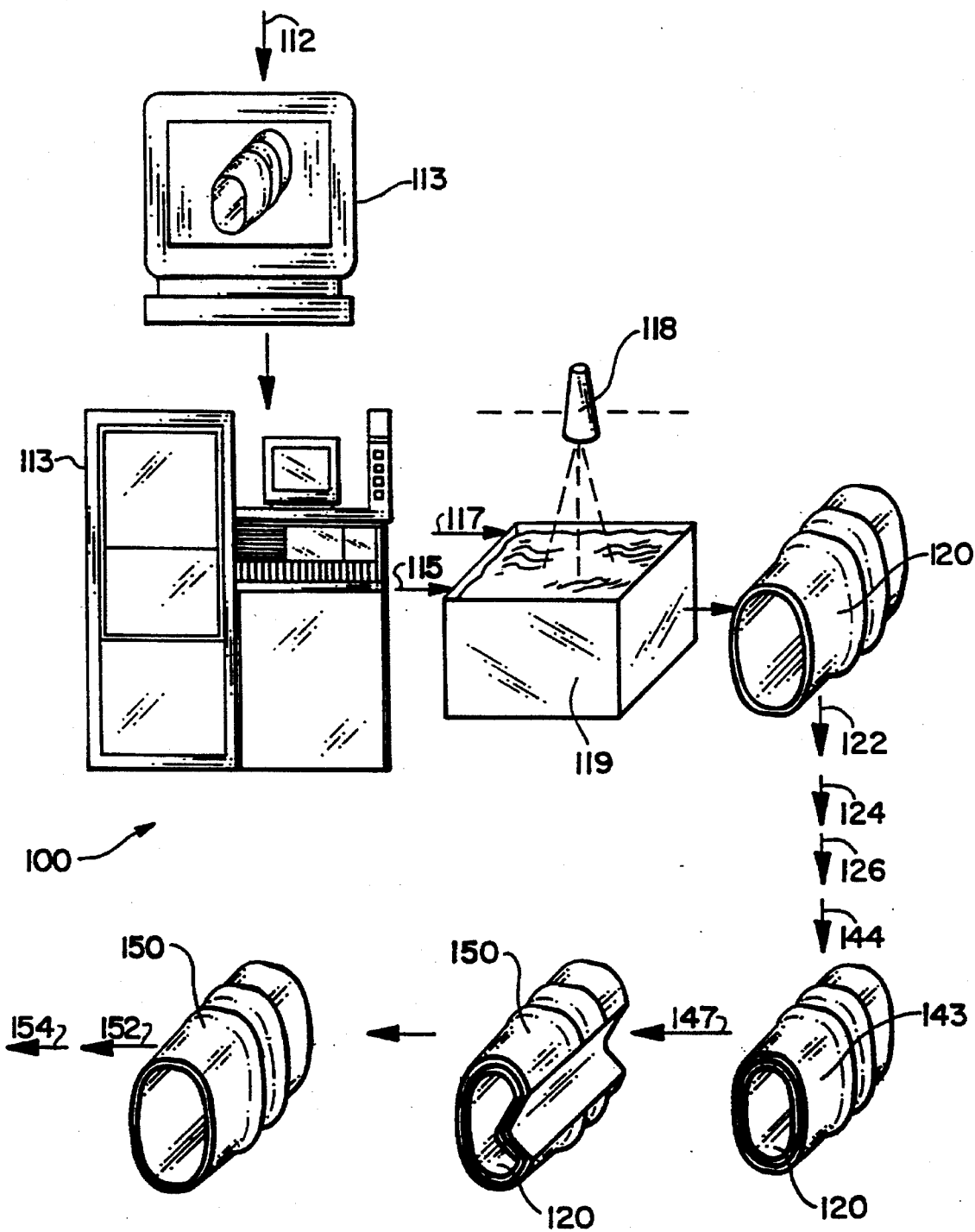
FIG. 4 is a schematic diagram of the stereolithographic tool-aided manufacturing process of the present invention, illustrating fabrication of a sample part.

Referring now to FIGS. 3 and 4, there are shown a flow diagram and a schematic diagram respectively, of manufacturing process 100 of the present invention for fabricating flexible reinforced rubber parts using stereolithography (SLA) tooling. The stereolithographic tool is created directly from a three-dimensional computer-aided design (CAD) data base design of the inside mold line of the designed part. The SLA tool is then used to fabricate the reinforced rubber part, eliminating the need for the prior art multi-step tooling process.

Utilizing the process of the present invention, the rubber part to be fabricated is designed on a CAD system shown by reference number 113 during process step 112. After the design has been completed, the three-dimensional CAD designed part is sliced by SLA software into thin imaginary cross-sections during process step 115.

Using the imaginary cross-sections in a computer-controlled optical scanning system, a laser 118, generating an intense spot of ultraviolet light, is moved across the top of a vat of liquid photopolymer resin 119 during a process step 117. As the laser 118 moves across the liquid photopolymer 119, the photopolymer solidifies into an outline determined by the imaginary cross-sections. This step is repeated until the entire cross-sectional layer is complete. Subsequent layers using all the imaginary cross-sections are successively added to form a complete SLA tool 120. The photopolymer used to manufacture the SLA tool must be sufficiently brittle upon solidification to permit the SLA tool to be removed from the final part at a later step. A photopolymer such as Cibatool SL XB 5081-1 manufactured by CIBA-GEIGY Corporation is an exemplary photopolymer.

After the SLA tool 120 is built, it is allowed to cure during step 122 to complete the polymerization process. The cured SLA tool 120 is then cleaned.

After the SLA tool 120 is totally cured and cleaned, the surface of the tool 120 is prepared with a sealant and a parting agent during a processing step 124. Next, glass fabric that has been wet out with RTV silicone resin 143 is manually applied in successive plies during the process step 144. The number of plies of material is determined by the flexibility and strength requirements of the final part 150.

The lay-up 143 of the final part 150 is allowed to cure for approximately twelve to twenty-four hours. The SLA tool 120 is then shattered during step 147 and removed from the final part 150. The final part 150 is cleaned and trimmed during step 152, and is ready for quality inspection during process step 154.

An advantage of the manufacturing process of the present invention over the prior art processes is the significant reduction in tooling requirements. The process of the present invention utilizes a single SLA tool to fabricate a final rubber part. The reduction in tools required to produce a part from three to one contributes to significant labor and time savings over the prior art methods. The reduction of in-process time and touch time also reduces the potential for human error. The SLA tool comes directly from the designed CAD data base. Thus, it is likely that the final part will function as planned without additional modification.

Another advantage of the process of the present invention is the ease of incorporating design changes during production or during the manufacturing process. Changes to the original design are incorporated into the data base on the CAD system, and the resulting SLA tool revised prior to formation. Because intermediate tool requirements are eliminated, any rework necessary on the revised part is drastically reduced.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions of steps and elements without departing from the spirit of the invention.

I claim:

1. A process for the manufacture of a flexible rubber part comprising the steps of:

designing a part on a computer-aided design system;

creating from the computer-aided design imaginary cross-sections of the designed part;

selecting a liquid photopolymer having sufficiently brittle properties upon solidification and curing to be shatterable;

stereolithographically solidifying the liquid photopolymer by laser beam energy in accordance with a created cross-section of the part;

repeating the previous step for each cross-section to form a complete stereolithographic tool;

curing the solidified liquid photopolymer of the resulting stereolithographic tool;

cleaning the solidified liquid photopolymer of the cured stereolithographic tool;

preparing the surface of the stereolithographic tool with a sealant;

preparing the surface of the stereolithographic tool with a parting agent;

applying successive layers of glass fabric and silicone resin to the prepared stereolithographic tool to produce a flexible reinforced rubber part;

curing the successive layers of glass fabric and silicone resin of the reinforced rubber part; and deforming the reinforced rubber part to shatter and remove the stereolithographic tool.

2. The process of claim 1 wherein the laser emits light substantially in the ultraviolet spectrum.

\* \* \* \* \*